US010812288B2

(12) United States Patent
Nakamura

(10) Patent No.: US 10,812,288 B2
(45) Date of Patent: Oct. 20, 2020

(54) COMMUNICATION SYSTEM

(71) Applicant: Yazaki Corporation, Tokyo (JP)

(72) Inventor: Yoshihide Nakamura, Susono (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/577,313

(22) Filed: Sep. 20, 2019

(65) Prior Publication Data

US 2020/0127871 A1  Apr. 23, 2020

(30) Foreign Application Priority Data

Oct. 18, 2018  (JP) .................................. 2018-196431

(51) Int. Cl.
*H04L 12/40* (2006.01)
*H04L 12/403* (2006.01)
*H04L 12/10* (2006.01)

(52) U.S. Cl.
CPC ........ *H04L 12/40019* (2013.01); *H04L 12/10* (2013.01); *H04L 12/403* (2013.01); *H04L 2012/40273* (2013.01)

(58) Field of Classification Search
None
See application file for complete search history.

(56) References Cited

U.S. PATENT DOCUMENTS

2005/0274982 A1* 12/2005 Ueda ................... H01L 29/8611
257/202
2014/0351868 A1* 11/2014 Wende ............... H04B 7/18506
725/75

FOREIGN PATENT DOCUMENTS

JP  2010-184575 A  8/2010

* cited by examiner

*Primary Examiner* — Farley Abad
*Assistant Examiner* — Dayton Lewis-Taylor
(74) *Attorney, Agent, or Firm* — Sughrue Mion, PLLC

(57) ABSTRACT

A communication system capable of shortening a setting time of an ID and reducing an incorrect setting is provided. A master device, when receiving an ID assignment request from a writing device, turns on all a plurality of semiconductor relays, and after a predetermined time has elapsed, turns all off, sequentially turns on the semiconductor relays and each time turning on the semiconductor relays, sends the corresponding ID. The plurality of slave devices, when receiving the ID assignment request from the writing device after supplying power, stores the fact in the ID request area, waits for a reception of the ID from the master device without confirming reception of the ID assignment request, and sets the ID as its own ID if determining that the ID assignment request has already been received by the ID request area after power is supplied.

8 Claims, 6 Drawing Sheets

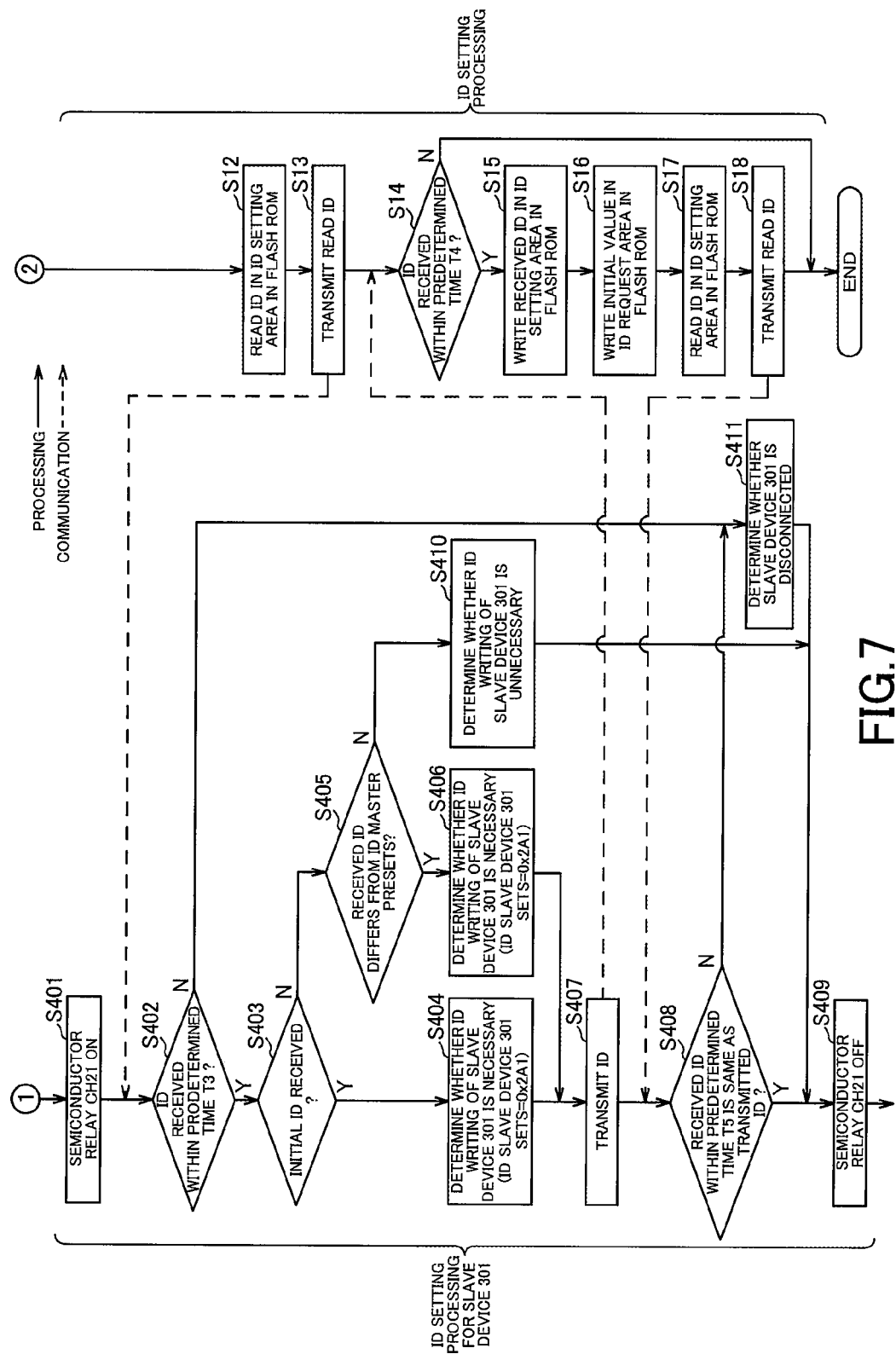

COMMUNICATION SYSTEM

BACKGROUND OF THE INVENTION

Field of the Invention

The present invention relates to a communication system.

Description of the Related Art

A vehicle such as a passenger car and a freight car is equipped with various loads such as a lamp and a power window. Then, there has been proposed a technology for controlling the loads using communication with a slave device to which a plurality of loads is connected and a master device controlling the plurality of slave devices.

In the above technology, the plurality of slave devices to which the plurality of loads is respectively connected needs to be set an ID.

As a method of setting the above-mentioned ID, for example, the one described in Patent Literature 1 has been proposed. In the ID setting method described above, each time a slave device whose ID is not set is connected to the in-vehicle LAN, the master device sends an ID to the slave device, and the slave device stores the ID.

However, there was a problem that setting the ID for each connection of the slave device requires a long time for the ID setting. There was also the problem that since the order of ID to be sent by the master device to the slave device is fixed, the ID different from the original is set if the connection order to the in-vehicle LAN of the slave device is different.

CITATION LIST

Patent Literature 1: JP-A-2010-184575

SUMMARY OF THE INVENTION

The present invention has been made in view of the above background, and it is an object of the present invention to provide a communication system capable of shortening an ID setting time and reducing an erroneous setting.

A communication system according to an aspect of the present invention includes: a plurality of slave devices; a master device configured to communicate with the plurality of slave devices; and a writing device configured to write, after setting of an ID of the salve device, the ID to the slave device, the master device includes a plurality of switches provided for each of the plurality of slave devices and configured to supply power to the corresponding slave devices, a first switch controller configured to turn on all the plurality of switches when receiving an ID assignment request and turn off all the plurality of switches after a predetermined time has elapsed, and a second switch controller configured to turn on the plurality of switches in sequence after control by the first switch controller, and the plurality of slave devices includes a first storage unit into which upon a receipt of the ID assignment request from the writing device after power is supplied, an event of the receipt of the ID assignment request is stored, a receiver configured to wait the reception of the ID to be transmitted from the master device or the writing device without confirming the receipt of the ID assignment request when determining that the receipt of the ID assignment request has been received after power is supplied, and a setting unit configured to set the ID received from the receiver as its own ID.

Further, preferably, the master device includes a second storage unit configured to store IDs corresponding to the plurality of switches, and a transmitter configured to transmit the corresponding ID each time the second switch controller turns on the plurality of switches.

Further, preferably, the master device is installed in a vehicle, the plurality of slave devices is connected to a plurality of loads, and provided that the plurality of loads is classified as a load that can be driven at all times, a load that can be driven during driving an accessory, and a load that can be driven on ignition, a same type of load is connected to one of the slave devices.

Further, preferably, the master device is installed plurally in a vehicle, the ID includes installation information indicating an installation position of the master device in the vehicle.

According to the aspect described above, since there is no need to allocate an ID each time the slave device is connected, the setting time of the ID can be shortened and erroneous setting can be reduced.

BRIEF DESCRIPTION OF THE DRAWINGS

FIG. 7 is a flow chart showing a processing procedure to be executed by the master device and the slave device shown in FIG. 1.

DETAILED DESCRIPTION OF THE PREFERRED EMBODIMENTS

Figure 1:
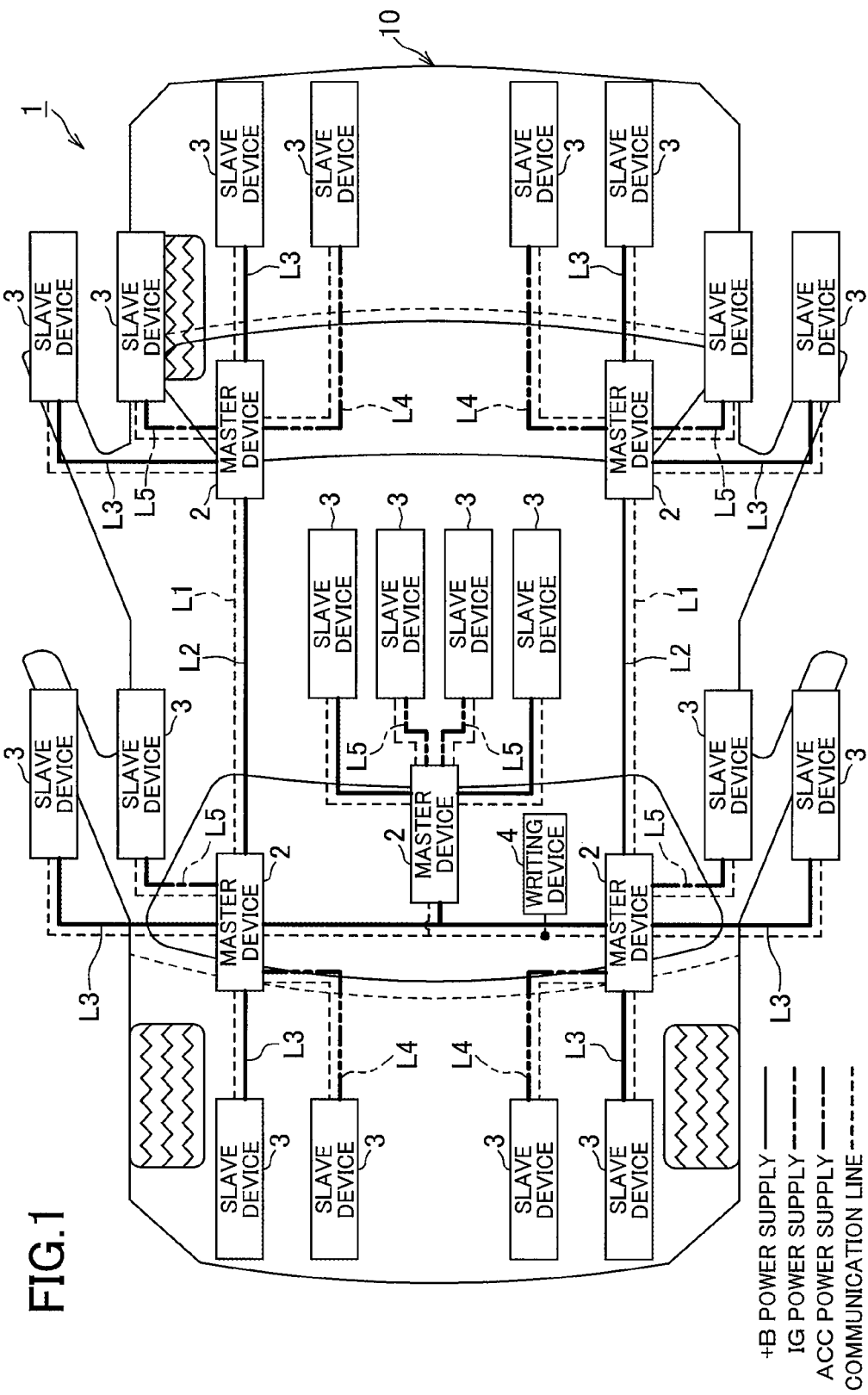
FIG. 1 is a block diagram showing an in-vehicle network as a communication system of the present invention.
Figure 2:
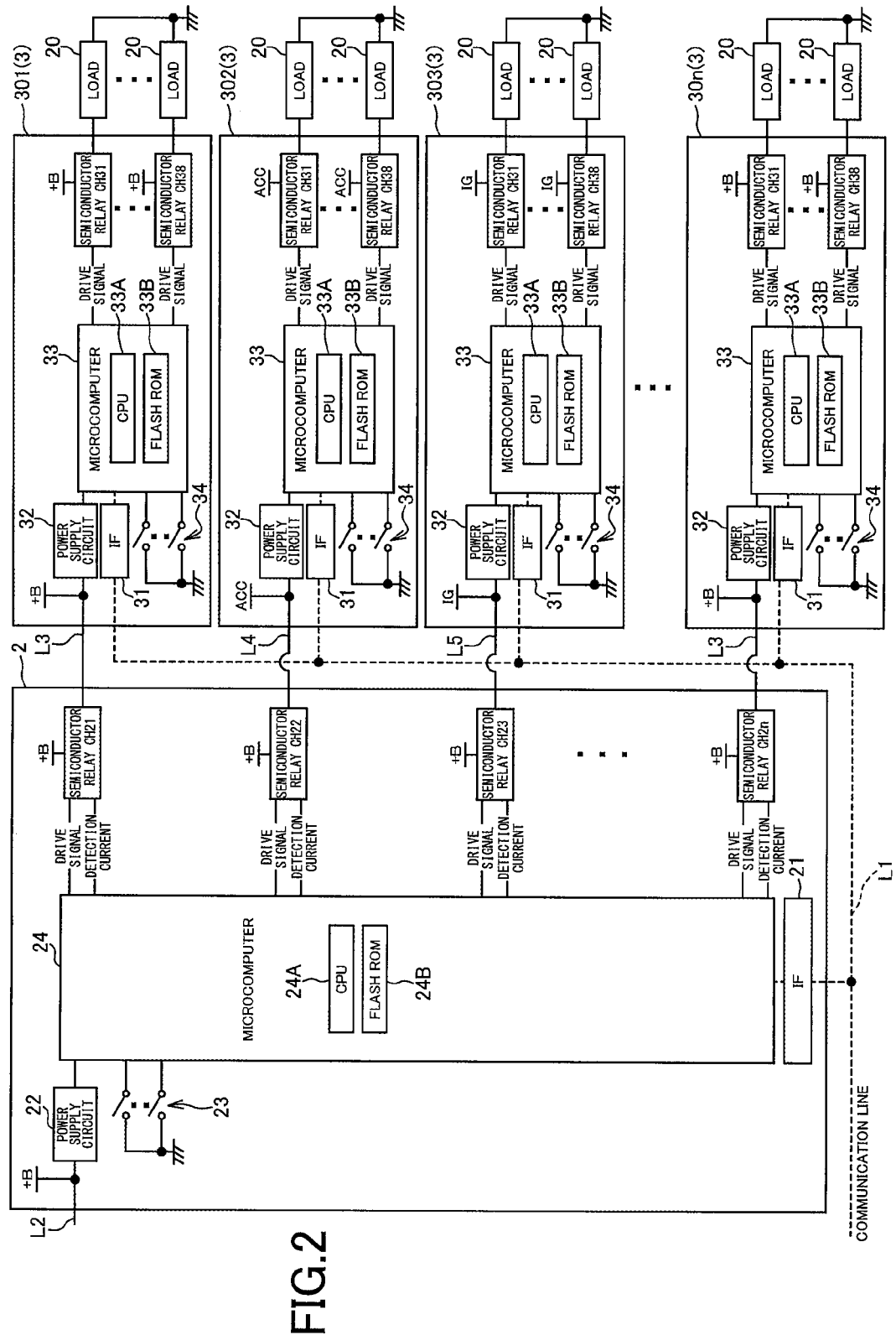
FIG. 2 is a block diagram showing a master device and a slave device that make up the in-vehicle network shown in FIG. 1.

Hereinafter, an embodiment of the present invention will be described based on FIGS. 1 and 2. FIG. 1 is block diagram showing an in-vehicle network 1 as a communication system of the present invention. FIG. 2 is a block diagram showing a master device 2 and a slave device 301-30n that make up an in-vehicle network 1 shown in FIG. 1.

An in-vehicle network 1 shown in FIG. 1 is mounted on a vehicle 10. The in-vehicle network 1 includes a plurality of master devices 2 and a plurality of slave devices 3 (which may be described as slave devices 301-30n as shown in FIG. 2). The plurality of master devices 2 is arranged in each area in a vehicle 10. In the present embodiment, the master device 2 is respectively arranged on front right side (FR-RH), front left side (FR-LH), front center (FR-CENTER), rear right side (RR-RH), and rear left side (RR-LH) in five places in the vehicle 10.

The five master devices 2 are communicably connected to each other by a communication line L1. The master device 2 is connected to each other by +B power supply line L2 connected to a battery (not shown), and is supplied power via +B power supply line L2.

In addition, each of five master devices 2 is communicably connected to the plurality of slave devices 3 arranged in its own area via the communication line L1. The master device 2 and the slave device 3 are connected by one to multiple. The master device 2 communicates with the plurality of slave devices 3, and thereby controls the plurality of slave devices 3. The slave device 3 is connected to multiple loads 20 (FIG. 2) such as a lamp, a seat motor and a door motor placed in its own area and controls driving of the load 20 according to the communication with the master device 2.

The slave devices 3 in each area are provided separately for +B to be connected to the load 20 that can always be driven, for an ACC to be connected to load 20 that can be driven at driving accessory, and for an IG to be connected to the load 20 that can be driven upon ignition.

Next, a configuration of the above-described master device 2 will be described. The Multiple master devices 2 are one configuration, and each includes an interface (hereinafter referred to as I/F) 21, a power supply circuit 22, multiple local SWs 23, a microcomputer (micro computer) 24 and a plurality of semiconductor relays CH21 to CH2$n$ as switches as shown in FIG. 2.

The I/F 21 is a communication interface for communicating with other master devices 2 and the plurality of slave devices 3. The I/F 21 is an interface that can input and output corresponding signal compatible with various types of communication (CAN, LIN, other communication methods). The power supply circuit 22 is a circuit generating power supply for the microcomputer 24 to be described later from the power supply supplied from the +B power supply line L2, and supplying power to the microcomputer 24. The local SW 23 is operated by the user to operate the load 20.

Figure 3:
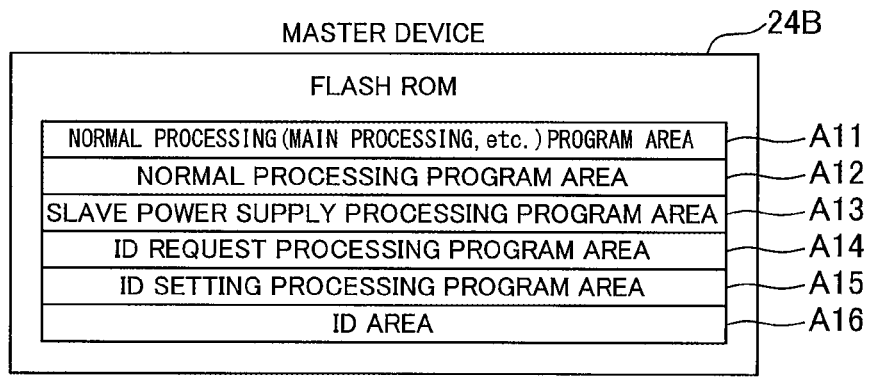
FIG. 3 is a diagram showing a configuration of a flash ROM of the master device shown in FIG. 2.

The microcomputer 24 includes a known CPU (Central Processing Unit) 24A as a first switch control unit, a second switch control unit, and a transmission unit, and a flash ROM (Read Only Memory) 24B as a second storage unit. The CPU 24A controls entirely the master device 2, and perform various processes according to the processing program. The flash ROM 24B contains, as shown in FIG. 3, a normal processing program area A11, a communication processing program area A12, a slave power supply processing program area A13, an ID request processing program area A14, an ID setting processing program area A15, and an ID area A16.

In the normal processing program area A11, a program for executing a basic operation such as normal processing (main processing) is stored. In the communication processing program area A12, a communication processing program for executing communication with master device 2 in other area or slave device 3 in own area is stored. In the slave power supply processing program area A13, a slave power supply processing program for executing power supply (slave activation) to the slave device 3 is stored.

In the ID request processing program area A14, an ID request processing program for executing writing of the ID request to an ID request area A33 of the slave device 3 to be described later is stored. In the ID setting processing program area A15, an ID setting processing program for executing writing of the ID to an ID setting area A32 of the slave device 3 to be described later is stored. In the ID area A16, IDs of all slave devices 3 to be connected to the master device 2 are stored in advance.

The semiconductor relays CH21 to CH2$n$ shown in FIG. 2 are provided for each of the plurality of slave devices 301 to 30$n$ in a one-to-one correspondence. The semiconductor relays CH21 to CH2$n$ are connected to the slave devices 301 to 30$n$ for +B, for ACC, for IG via +B power supply line L3, ACC power supply line L4, and IG power supply line L5, respectively. The semiconductor relays CH21 to CH2$n$ turn on when the drive signal is output from the microcomputer 24, and supplies power from the +B power supply line L2 to the corresponding slave device 3 via the +B power supply line L3, the ACC power supply line L4 and the IG power supply line L5.

The semiconductor relays CH21 to CH2$n$ have function of detecting the current flowing to their own, and have the detection current inputted to the microcomputer 24.

Next, the configuration of the above-described slave devices 301 to 30$n$ will be described. Multiple slaves devices 301 to 30$n$ have the same configuration, and each has an I/F 31, a power supply circuit 32, and a microcomputer 33, a plurality of local SWs 34, and a plurality of semiconductor relays CH31 to CH38. The I/F 31 is an interface for communicating with the master device 2, and can input and output signals compatible with each communication (CAN, LIN, and other communication ways). The power supply circuit 32 generates power supply for the microcomputer 33 to be described later from the +B power supply line L3, the ACC power supply line L4, and the IG power supply line L5, and supplies it to the microcomputer 33.

Figure 4:
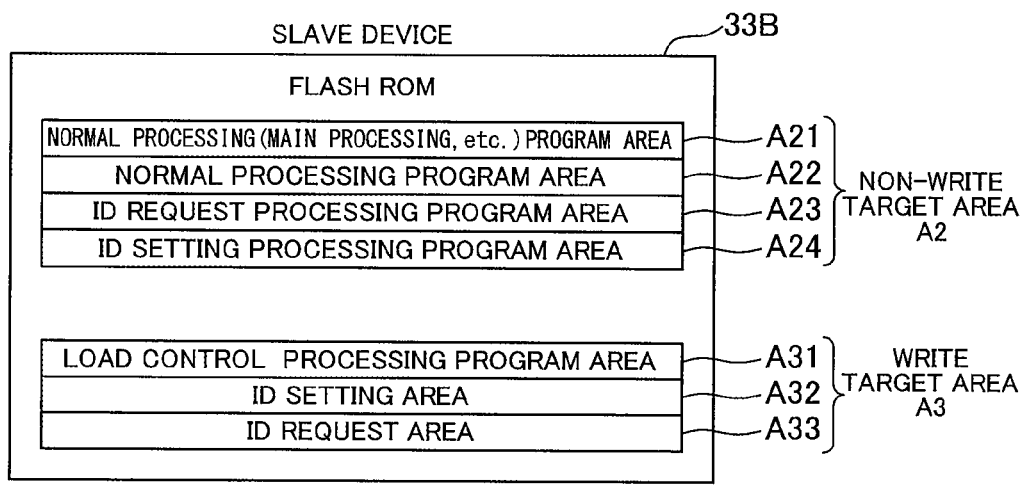
FIG. 4 is a diagram showing a configuration of a flash ROM of the slave device shown in FIG. 2.

The microcomputer 33 has a CPU 33A as a receiving unit and a setting unit, and a flash ROM 33B as a first storage unit. The CPU 33A controls the entire slave device 3 and perform various processes according to the processing program. In the flash ROM 33B, as shown in FIG. 4, a non-write target area A2 not to be written by the writing device 4 described later and a write target area A3 to be written by the write device 4 are formed.

In the non-write target area A2, a normal processing program area A21, a communication processing program area A22, an ID request processing program area A23, and an ID setting processing program area A24 are formed. In the normal processing program area A21, a program for executing basic operations such as normal processing (main processing) is stored. In the normal processing program area A22, a communication processing program for executing communication with the master device 2 in its own area is stored. In the ID request processing program area A23, an ID request processing program for executing writing of the ID request into the ID request area A33 of the slave device 3 to be described later is stored. In the ID setting processing program area A24, an ID setting processing program for executing writing of ID into the ID setting area A32 of the slave device 3 to be described later is stored.

In the write target area A3, a load control processing program area A31, an ID setting area A32 and an ID request A33 are formed. In the load control processing program area A31, a load control processing program for controlling the load 20 is stored. In the initial stage, since the load control processing program is not written to the load control processing program area A31, no load operation is performed. In the load control processing program area A31, the load control processing program is written by the writing device 4 after ID setting.

The ID of the slave device 3 is stored in the ID setting area A32. The ID request is written in the ID request area A33. In the initial stage, an initial ID (for example, 0x000) is written in the ID setting area A32 of all slave devices 301 to 30$n$, and an initial ID request (for example, 0x000) is written in the ID request area A33. The initial ID is a temporary ID and a transmission initial ID and a reception initial ID are set.

The plurality of local SW 34 shown in FIG. 2 is connected to the microcomputer 33 and on-and-off information is entered in the microcomputer 33. The plurality of semiconductor relays CH31 to CH38 is respectively connected between the microcomputer 33 and the load 20, and is turned on/off according to the drive signal from the microcomputer 33. The semiconductor relays CH31 to CH38, when turned on, supplies power from the +B power supply line L3, the ACC power supply lines L4 or the IG power supply line L5 to the load 20.

In addition, semiconductor relays CH31 to CH38 have a current detection function that detects the current flowing to them, and have the detected current input to the microcomputer 33. The number of the semiconductor relays CH31 to CH38 provided to the slave device 3 is described by taking eight as an example in the present embodiment, but not limited to this, and it may be any number. All slave devices 3 have the same number of semiconductor relays CH31 to CH38.

Next, a bit assignment (allocation) of the signal transferred between the master device 2 and the slave device 3 is described with reference to Table 1 below.

the right side, "10" the left side, and "11" the center in the left-right direction of the vehicle 10.

Bit 6 is allocated to the preliminary information. The preliminary information is always "0".

Bit 5 is allocated to the transmission/reception information, which becomes "1" if the slave devices 301 to 30$n$ transmit to the master devices 2, "0" if the slave devices 301 to 30$n$ receive from the master device 2.

Bit 4 to bit 0 are allocated to the slave information. The slave information is allocated to the plurality of slave devices 301 to 30$n$ connected to the master device 2 without duplication (it may overlap between the slave devices 301 to 30$n$ connected to the different master devices 2).

In the ID area A16 of the master device 2, IDs (bit 10 to bit 0) for all slave devices 301 to 30$n$ to be connected via the semiconductor relays CH21 to C2$n$ are pre stored.

A BYTE 1 of bit 7 to bit 0 following the ID represents the load control information after setting the ID. The bit 7 to bit 0 are allocated to the semiconductor relays CH31 to CH38, respectively. Then, if each bit n (n is an arbitrary integer from 0 to 7) is "0", it indicates that the semiconductor relay CH3$n$+1 allocated to the bit n is off. If each bit n (n is any integer from 0 to 7) is "1", the semiconductor relay CH3$n$+1 allocated to the bit n is on.

Before setting of the ID, bit7 to bit0 of the BYTE1 are blank.

Next, the ID setting operation of the on-vehicle network 1 having the above-described configuration will be

TABLE 1

| ID | | | | | | | | | | |
|---|---|---|---|---|---|---|---|---|---|---|
| INSTALLATION INFORMATION | | | | PRELIMINARY | TRANSMISSION/ RECEPTION INFORMATION | | SLAVE TYPE INFORMATION | | | |
| bit10 | bit9 | bit8 | bit7 | bit6 | bit5 | | bit4 | bit3 | bit2 | bit1 bit0 |
| FRONT: 01 REAR: 10 CENTER: 11 | | RIGHT: 01 LEFT: 10 CENTER: 11 | | 0 | RECEPTION: 0 TRANSMISSION: 1 | | SLAVE DEVICE 301: 0001 SLAVE DEVICE 302: 0002 . . . SLAVE DEVICE 30n: XXXX | | | |

| BYTE1 LOAD CONTROL INFORMATION | | | | | | | |
|---|---|---|---|---|---|---|---|
| bit7 | bit6 | bit5 | bit4 | bit3 | bit2 | bit1 | bit0 |
| CH38 ON: 1 OFF: 0 | CH37 ON: 1 OFF: 0 | CH36 ON: 1 OFF: 0 | CH35 ON: 1 OFF: 0 | CH34 ON: 1 OFF: 0 | CH33 ON: 1 OFF: 0 | CH32 ON: 1 OFF: 0 | CH31 ON: 1 OFF: 0 |

As shown in Table 1 above, the first bit 10 to bit 0 represent the identification information (ID) of the slave devices 301 to 30$n$. The identification information is allocated without duplication to all slave devices 301 to 30$n$ disposed in the vehicle 10. The identification information is constituted by installation information, preliminary information, transmission/reception information, and slave information.

Bit 10 to bit 7 are allocated to the installation information. The bit 10 to bit 9 indicate the installation position in a traveling direction of the vehicle 10, which becomes "01" if the installation position of the slave devices 301 to 30$n$ corresponds to the front side "10" the rear side, and "11" the center of a traveling direction of the vehicle 1. The bit 8 to bit 7 indicate the installation position of the vehicle 10 in the left and right direction, which becomes "01" if the installation position of the slave device 301 to 30$n$ corresponds to described with reference to the flowchart of FIGS. 5 to 7. In the initial state (when ID is not set), in all slave devices 301 to 30$n$ the same initial ID (initial reception ID, initial transmission ID), initial ID request are set, and stored in the ID setting area A32 of the flash ROM 33B. The initial value is also stored in the ID request area A33.

The IDs to be set in the slave devices 301 to 30$n$ are two types of a reception ID and a transmission ID. Because only one difference between the two is, as shown in Table 1, transmission/reception information (bit 5 of the ID), the transmission/reception ID is automatically determined if either one is determined. In the present embodiment, the setting of the reception ID is described, as the initial reception ID is set such that as shown in Table 2 below, bit 10 to bit 0 is set to "00000000000" in which "0" becomes "1".

TABLE 2

| ID (CAN: 11 bit) | | | | | | | | | | |
|---|---|---|---|---|---|---|---|---|---|---|
| INSTALLATION INFORMATION | | | | PRELIMINARY | TRANSMISSION/ RECEPTION INFORMATION | SLAVE INFORMATION | | | | |
| bit10 | bit9 | bit8 | bit7 | bit6 | bit5 | bit4 | bit3 | bit2 | bit1 | bit0 |
| 0 | 0 | 0 | 0 | 0 | 0 | 0 | 0 | 0 | 0 | 0 |

First, the user connects the writing device 4 (FIG. 1) to the communication line L1. The writing device 14 is set the order of the areas for which the ID is to be set. For example, in the example shown in FIG. 1, in this order of RH→RR-RH→RR-LH→FR-LH→FR-CENTER or FR-CENTER→FR-LH→RR-LH→RR-RH→FR-RH, the order of connection for the communication line L1 is set.

Figure 5:
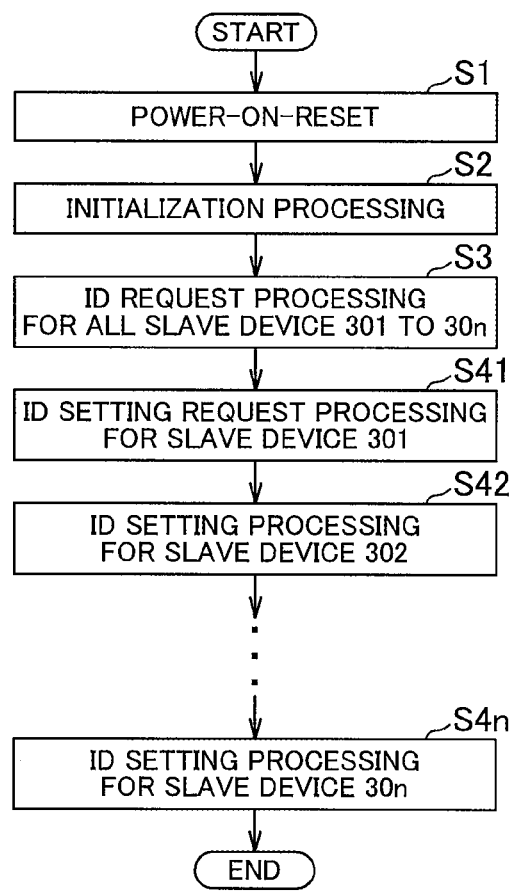
FIG. 5 is a flowchart showing a processing procedure to be executed by the master device shown in FIG. 1.

First, the microcomputer 24 of the master device 2 (hereinafter sometimes referred to simply as the master device 2) executes the process shown in FIG. 5 after startup, and first performs power-on-reset and initial process (Steps S1 and S2).

After that, the master device 2 executes the ID request setting processing (step S3) to all slave devices 301 to 30n before executing the ID setting to the slave devices 301 to 30n sequentially (steps S41 to S4n).

Figure 6:
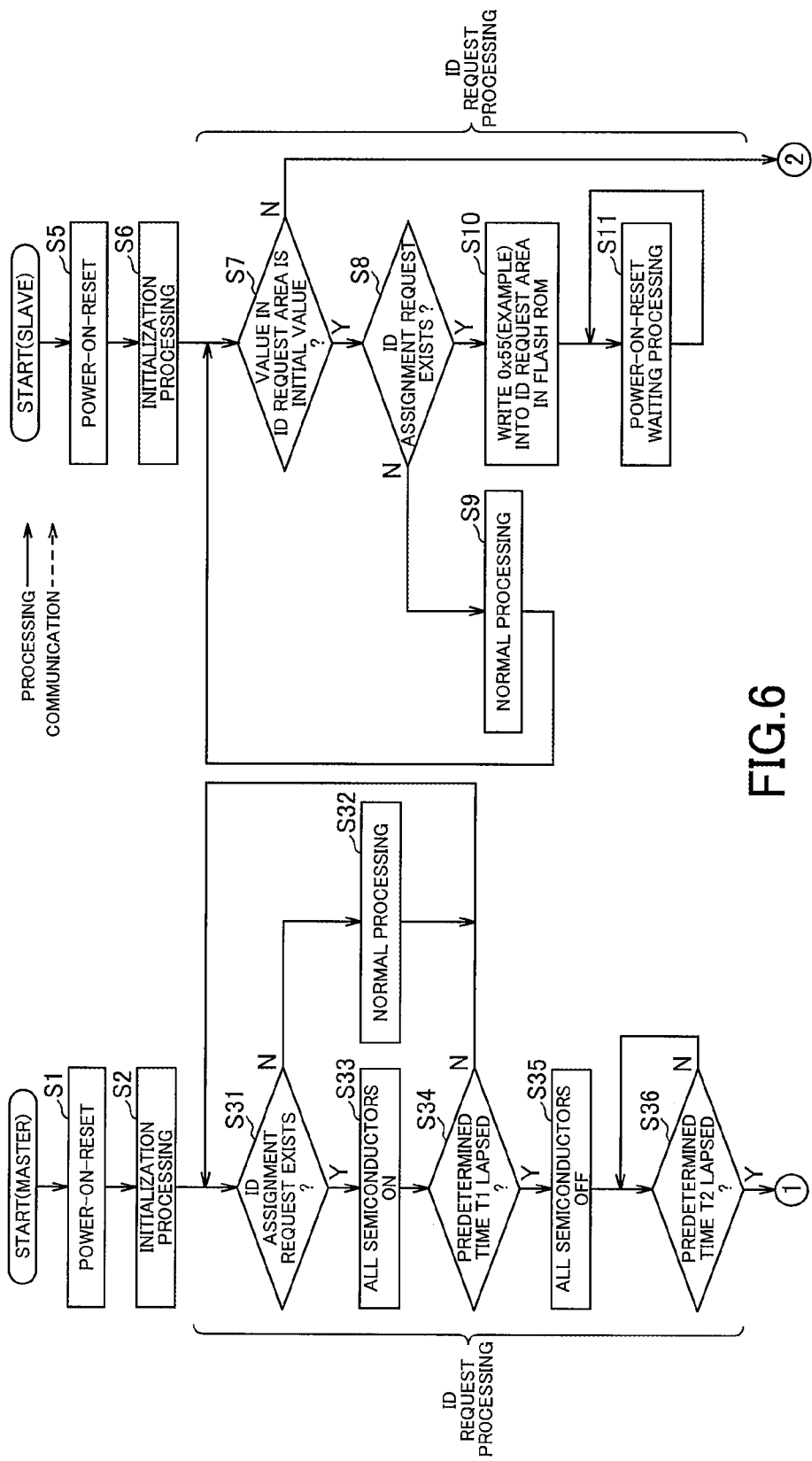
FIG. 6 is a flow chart showing a processing procedure to be executed by the master device and the slave device shown in FIG. 1.

The details of the ID request setting process will be described with reference to FIG. 6. The master device 2 determines whether the ID assignment request has been received from the writing device 4 (step S31). If the ID assignment request cannot be received from the writing device 4 (N in step S31), the master device 2 shifts to normal processing (step S32). In normal processing, the master device 2 periodically returns to step S31.

On the other hand, when the ID assignment request is received (Y in step S31), the master device 2 turns on receives all semiconductor relays CH21 to CH2n (step S33). In this way, power is supplied to all the slave devices 301 to 30n, which are then activated.

The slave devices 301 to 30n, when power is supplied to activate, first executes power-on-reset and initialization (steps S5 and S6). After that, the slave devices 301 to 30n execute the ID request process (steps S7 to S11). In the ID request processing, the slave device 3 determines whether the value of the ID request area A33 is an initial value (step S7). The slave devices 301 to 30n, when determining that they are initial values (Y in step S7), determines whether the ID assignment request from the writing device 4 has been received (step S8).

If the ID assignment request from the writing device 4 cannot be received (N in step S8), the slave device 3 shifts to normal processing (step S9). In normal processing, the slave device 3 periodically returns to step S7. If the ID assignment request from the writing device 4 can be received (Y in step S8), the slave device 3 writes a value other than the initial value (for example, 0x55) into the ID request area A33 of the flash ROM 33B (step S10), shifts to the power-on-reset processing (Step S11) and wait until the power is shut off.

The master device 2 turns on all semiconductor relays CH21 to CH2n, waits a predetermined time T1 to elapse (Y in step 34) and turns off all semiconductor relays CH21 to CH2n (Step S35). After that, the master device 2 waits for a predetermined time T2 to elapse (Y in step S36), and executes the ID setting process for the slave device 301 (Step S41 in FIG. 5).

In the ID setting process of step S41, as shown in FIG. 7, the master device 2 turns on the semiconductor relay CH21 (step S401). At this time, the semiconductor relays CH22 to CH2n are kept off. When the semiconductor relay CH21 is turned on, the slave device 301 is again turned on and restarts.

After restart, the slave device 301 executes power-on-reset and initialization processing (Steps S5 and S6 in FIG. 6), before determining whether or not the value of the ID request area A33 is an initial value (step S7). After the restart, in the ID request area A33, other than the initial value is stored. Thus, after restart, the slave device 301 determines that it is not the initial value (Y in step S7), and executes the ID setting processing (steps S12 to S18 in FIG. 7).

In the ID setting process, the slave device 301 reads the ID stored in A32 of the ID setting area of the flash ROM 33B (step S12). After that, the slave device 301 sends the read ID to the master device 2 (step S13).

The master device 2 receives the ID from the slave device 301 within a predetermined time T3 after turning on the semiconductor relay CH21 (Y in step S402), and determines whether or not the received ID is an initial ID (step S403). If it is an initial ID (Y in step S403), the master device 2 determines that writing of the ID to the slave device 301 is necessary, and reads the ID of the slave device 301 from the ID area A16 (step S404).

Even if it is not the initial ID (N in step S403), the master device 2, if the received ID and the ID of the slave device 301 stored in the ID area A16 are different (Y in step S405), determines that the ID of the slave device 3 needs to be written, and reads the ID of the slave device 301 from the ID area A16 (step S406).

Next, the master device 2 transmits the ID read in steps S404 and S406 to the slave device 301 (step S407).

The slave device 301 receives the ID within a predetermined time T4 after ID transmission (step S13) (Y in step S14), and then writes the received ID into the ID setting area A32 of the flash ROM 33B (step S15). After that, the slave device 301 writes the initial value into the ID request area A33 of the flash ROM 33B (step S16). Next, the slave device 301 reads the ID of the ID setting area A32 of the flash ROM 33B (Step S17), and after transmitting the read ID to the master device 2 (Step S18), ends the process.

After transmitting the ID (step S407), the master device 2 receives the ID from the slave device 301 within the predetermined time T5, and if the received ID and the ID transmitted in step S407 are the same (Y in step S408), the process proceeds to step S409.

On the other hand, the master device 2, if the received ID and the ID of the slave device 3 connected to the semiconductor relay CH 21 stored in the ID area A16 are the same (N in step S405), determines that the writing of the ID of the slave device 3 is unnecessary (step S410), and immediately proceeds to step S409.

Further, the master device 2, if not receiving the ID from slave device 301 within time T3 (N in step S402) after the semiconductor relay CH21 is turned on (step S401), determines that the slave device 301 is not connected (step S411) and immediately proceeds to step S409.

In step S409, the master device 2, after turning off the semiconductor relay CH21, ends the ID setting process for the slave device 301. After that, the master device 2 similarly sequentially executes the ID setting process of the slave devices 302 to 30n (step S42 to S4n).

The ID is set to all the slave devices 301 to 30n by the above operation. After the ID is set to all the slave devices 301 to 30n, the writing device 4 sends the load control processing program corresponding to the ID. Receiving the load control program addressed to itself, each slave device 301 to 30n writes it in the load control program area.

According to the embodiment described above, the master device 2, after receiving the ID assignment request from the writing device 4, turns on all the semiconductor relays CH21 to CH2n, and lets all the slave devices 301 to 30n simultaneously perform reception confirmation of the ID assignment request from the writing device 4, and after that turns on the semiconductor relays CH21 to CH2n sequentially to allocate the ID. In this way, there is no need for each slave device 301 to 30n to confirm receipt of the ID assignment request each time sending the ID, and the time for ID setting can be shortened.

Further, according to the present embodiment, after the master device 2 and the slave devices 301 to 30n are assembled and connected to the in-vehicle network 1, the semiconductor relays CH21 to CH2n are turned on and off, and thus the ID can be set. Thereby, since it is not necessary to allocate the ID for each time the slave device 3 is connected (assembled), it is possible to shorten the setting time of the ID and reduce erroneous settings.

According to the embodiment described above, the master device 2 is installed in the vehicle 10 and the plurality of slave devices 3 is connected to the plurality of loads 20. The plurality of loads 20 is classified into the load 20 that can be driven at any time, the load 20 that can be driven as the accessory, and the load 20 that can be driven upon ignition. The same type of load 20 is connected to one slave device 3. Thus, power is supplied to the slave device 3, the semiconductor relays CH21 to CH2n for enabling the load 20 to be driven are used to, and the setting of the ID can thus be performed.

According to the embodiment described above, the plurality of master devices 2 is installed in the vehicle 10, and the ID stored in the flash ROM 24B contains the installation information that indicates the installation position of the master device 2 in the vehicle 10. As a result, the slave devices 3 set in the vehicle 10 can be easily allocated the separate ID.

Further, according to the above-described embodiment, although the master device 2 sends the ID of the slave devices 301 to 30n, it is not limited to this. The IDs of the slave device 301 to 30n from the writing device 4 may be sequentially transmitted. In this case, the master device 2 sequentially turns on the semiconductor relays CH21 to CH2n corresponding to the ID transmitted from the writing device station 4.

The present invention is not limited to the above embodiment. That is, various modifications can be made within the scope of the present invention without deviating from the gist of the present invention.

REFERENCE SIGNS LIST 1 in-vehicle network (communication system)
2 master device
3 slave device
4 writing device
301 to 30n slave devices
10 vehicle
20 load
CH21 to CH2n semiconductor relays (switches)
24A CPU (first switch controller, second switch controller, transmitter)
24B flash ROM (second memory unit)
33A CPU (reception unit, setting unit)
33B flash ROM (first storage unit)

What is claimed is:

1. A communication system comprising:
a plurality of slave devices;
a master device configured to communicate with the plurality of slave devices; and
a writing device configured to write, after setting of an ID of the slave device, the ID to the slave device, wherein
the master device includes a plurality of switches provided for each of the plurality of slave devices and configured to supply power to the corresponding slave devices, a first switch controller configured to turn on all the plurality of switches when receiving an ID assignment request and turn off all the plurality of switches after a predetermined time has elapsed, and a second switch controller configured to turn on the plurality of switches in sequence after control by the first switch controller, and wherein
the plurality of slave devices includes a first storage unit into which upon a receipt of the ID assignment request from the writing device after power is supplied, an event of the receipt of the ID assignment request is stored, a receiver configured to wait the reception of the ID to be transmitted from the master device or the writing device without confirming the receipt of the ID assignment request when determining that the receipt of the ID assignment request has been received after power is supplied, and a setting unit configured to set the ID received from the receiver as its own ID.

2. The communication system according to claim 1, wherein
the master device includes a second storage unit configured to store IDs corresponding to the plurality of switches, and a transmitter configured to transmit the corresponding ID each time the second switch controller turns on the plurality of switches.

3. The communication system according to claim 2, wherein
the master device is installed in a vehicle, the plurality of slave devices is connected to a plurality of loads, and wherein
provided that the plurality of loads is classified into a load that can be driven at all times, a load that can be driven during driving an accessory, and a load that can be driven upon ignition, a same type of the load is connected to one slave device.

4. The communication system according to claim 3, wherein
the master device is installed plurally in a vehicle, the ID includes installation information indicating an installation position of the master device in the vehicle.

5. The communication system according to claim 2, wherein
the master device is installed plurally in a vehicle, the ID includes installation information indicating an installation position of the master device in the vehicle.

6. The communication system according to claim 1, wherein
the master device is installed in a vehicle, the plurality of slave devices is connected to a plurality of loads, and wherein
provided that the plurality of loads is classified into a load that can be driven at all times, a load that can be driven during driving an accessory, and a load that can be driven upon ignition, a same type of the load is connected to one slave device.

7. The communication system according to claim 6, wherein
the master device is installed plurally in a vehicle, the ID includes installation information indicating an installation position of the master device in the vehicle.

8. The communication system according to claim 1, wherein
the master device is installed plurally in a vehicle, the ID includes installation information indicating an installation position of the master device in the vehicle.

* * * * *